United States Patent Office 2,832,786
Patented Apr. 29, 1958

2,832,786
PHOSPHORAMIDES

Charles H. Tilford and Frederick J. McCarty, Cincinnati, and Marcus G. Van Campen, Jr., Wyoming, Ohio, assignors to The Wm. S. Merrell Company, Cincinnati, Ohio, a corporation of Delaware No Drawing. Application February 27, 1956
Serial No. 567,735

2 Claims. (Cl. 260—294.7)

This invention relates to new chemical compounds which are useful as depressants for the central nervous system.

The new compounds can be represented by the generic formula

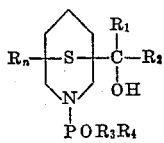

in which S signifies that the ring is saturated; $n$ is an integer from 1 to 4 inclusive; R is selected from the group consisting of the hydrogen atom and the methyl and ethyl radicals; $R_1$ and $R_2$ are selected from the group consisting of the methyl, ethyl, phenyl, chlorophenyl, tolyl, methoxyphenyl, benzyl, phenetyl, and cyclohexyl radicals; and $R_3$ and $R_4$ are lower alkoxy radicals having from 1 to 8 carbon atoms. The radical represented by the formula

can be attached to the piperidine ring at the 2-, 3- or 4-position.

The new phosphoramides are prepared by the reaction of a dialkylchlorophosphate with piperidinemethanols such as those disclosed in U. S. Patent 2,624,739 to Werner and Tilford; in our copending application, Serial No. 462,122, filed October 13, 1954; in copending application Serial No. 478,506, filed December 29, 1954, of Edward L. Schumann, Marcus G. Van Campen, Jr. and Raymond C. Pogge; and in copending applications Serial No. 487,464, filed February 10, 1955, and Serial No. 515,803, filed June 16, 1955, of Charles H. Tilford, Frederick J. McCarty, Marcus G. Van Campen, Jr., and Raymond C. Pogge. These intermediates produce compounds of the above generic formula in which $R_1$ and $R_2$ are selected from the group consisting of the hydrogen atom and the lower alkyl, e. g. isobutyl, lower alkylphenyl, lower alkoxyphenyl, hydroxyphenyl, halophenyl, aminophenyl, dimethylaminophenyl, methylenedioxyphenyl, p-trimethylsilylphenyl, mesityl, naphthyl, methoxynaphthyl, bicyclo (2.2.1)-2-heptyl, 3 to 8 carbon-atom ring cycloalkyl, lower alkylcyclohexyl, phenylcyclohexyl, methylisopropylcyclopentyl, furyl, tetrahydrofuryl, thienyl, pyridyl, piperidyl and indolyl radicals, and $R_1$ and $R_2$ when taken together with the carbon atom to which they are attached represent substituents selected from the group consisting of the bornyl, fenchyl, 1-indanyl, 1-tetralyl, 9-fluorenyl, 9-xanthyl, 10-thioxanthyl, 9-anthryl and 9-acridyl radicals and the like.

The new compounds, in general, affect the central nervous system by depression. The usefulness of these compounds in many cases, however, lies in the variations in mood which they produce rather than in measurable depression, e. g., some of the compounds cause dogs to become very amenable to command and people less bothered by worries and external annoyances. The new compounds are insoluble and thus advantageously are administered orally in tablet or other suitable form. Oral doses of the compounds of the invention should be in the 10 to 100 milligram range for human use.

The preparation of the piperidinemethanols from which the compounds of this invention are derived is illustrated below by Examples I to V. Examples VI to XVI illustrate the reaction of piperidinemethanols with a dialkylchlorophosphate to produce the phosphoramides of the present invention. These procedures are applicable to the preparation of all of the new compounds and are not to be construed as limiting the scope of the invention.

EXAMPLE I

α,α-Diphenyl-2-piperidinemethanol

A mixture of 48 grams (0.167 mole) of α,α-diphenyl-2-pyridinemethanol hydrochloride (Emmert et al., Ber. 72B, 1188 [1939]; 74B, 714 [1940]), 160 ml. of ethanol, and 0.5 gram of Adams' platinum catalyst was shaken under an initial hydrogen pressure of 60 lbs. The theoretical amount of hydrogen was absorbed in 5 hours. The reaction mixture was refluxed, diluted with enough water to dissolve all of the white solid which formed, and filtered hot from the catalyst. The filtrate was cooled and filtered; yielding a white product melting at 308–309° C. with decomposition.

Analysis.—Calculated for $C_{18}H_{21}ON \cdot HCl$: Cl, 11.75. Found: Cl, 11.85.

EXAMPLE II

α-Phenyl-α-methyl-2-piperidinemethanol hydrochloride

A solution of 30 grams (0.13 mole) of α-phenyl-α-methyl-2-pyridinemethanol hydrochloride in 100 ml. of ethanol was shaken at 70–80° C. at an initial hydrogen pressure of 50 lbs. in the presence of 0.4 gram of Adams' platinum catalyst. The theoretical amount of hydrogen was absorbed in 1 hour. The mixture was filtered and the filtrate was evaporated on the steam bath. The residue was recrystallized from butanone. The white crystalline hydrochloride product had a melting point of 182–184° C.

EXAMPLE III

α,α-Diphenyl-6-methyl-2-piperidinemethanol

Ethyl-6-methylpicolinate not hitherto reported in the literature was prepared by refluxing a mixture of 100 grams (0.66 mole) of 6-methyl-picolinic acid, 170 grams of ethanol, and 167 grams of concentrated sulfuric acid for 4 hours. The reaction mixture was subjected to vacuum distillation on the steam bath to remove most of the unchanged ethanol and the residue was treated with 200 ml. of concentrated ammonium hydroxide. The oil that formed was extracted with benzene and fractionally distilled; boiling point 122–126° C. at 10 mm.; $n_D{}^{25}$ 1.5060.

Analysis.—Calcd. for $C_9H_{11}O_2N$: C, 65.45; H, 6.71. Found: C, 65.28; H, 6.61.

α,α-Diphenyl - 6 - methyl-2-pyridinemethanol was prepared (according to the procedure of Example IV of copending application of Tilford et al., Serial No. 462,122, filed October 13, 1954) using 11 grams (1.6 moles) of lithium, 126 grams (0.80 mole) of bromobenzene and 64 grams (0.39 mole) of the above ethyl-6-methylpicolinate. To the lithium in dry ether is added the bromobenzene in dry ether with refluxing. To the cooled mixture is then added the ethyl-6-methylpicolinate. A crude product melting at 64–74° C. was obtained which, after being recrystallized from methanol, had a melting point of 88–91° C.

*Analysis.*—Calcd. for $C_{19}H_{17}ON$: C, 82.90; H, 6.23. Found: C, 82.71, H, 6.32.

The hydrochloride salt melted at 171–176° C. when recrystallized from methanol ether.

*Analysis.*—Calcd. for $C_{19}H_{17}ON \cdot HCl$: C, 73.19; H, 5.82. Found: C, 73.18; H, 5.98.

Hydrogenation of the above hydrochloride was carried out (by the procedure of Example I of copending application, Serial No. 462,122, filed October 13, 1954) to give the desired piperidinemethanol·HCl which melted at 278–279° C. with decomposition.

*Analysis.*—Calcd. for $C_{19}H_{23}ON \cdot HCl$: C, 71.78; H, 7.61. Found: C, 71.83; H, 7.59.

EXAMPLE IV

α,α-Diphenyl-3-piperidinemethanol

A mixture of 25 g. (0.084 mole) of α,α-diphenyl-3-pyridinemethanol·HCl [H. E. French, J. Am. Chem. Soc. 73, 469 (1951), reported M. P. 150–155° C. (chars.). This preparation: M. P. 227–232° C.] 200 ml. of methanol, and 0.6 g. of platinum oxide catalyst was hydrogenated according to the procedure of Example I. A yield of 20 g. of product melting at 184–186° C. (decomposition) was obtained.

The product was recrystallized from methanol-ether; yield: (a) 10 g. (39%); M. P. 203–205° C. (decomposition) and (b) 7 g. (28%); M. P. 182–184° C. An analytical sample of (a) melted at 206–208° C., (b) at 184–186° C. The melting point of an equal mixture of (a) and (b) was, 184–188° C. The product evidently exists in two polymorphic crystalline forms.

*Analysis.*—Calcd. for $C_{18}H_{21}ON \cdot HCl$: C, 71.15; H, 7.30. (a) Found: C, 71.35; H, 7.57. (b) Found: C, 71.11; H, 7.52.

EXAMPLE V

α,α-Di-p-tolyl-4-piperidinemethanol

Method D, disclosed in application, Serial No. 462,122, filed October 13, 1954, and described in Example III above, was used to prepare α,α-di-p-tolyl-4-pyridinemethanol which was obtained in 34 percent yield and had a melting point of 154–156° C. The pyridinemethanol hydrochloride melted at 202–203° C. The piperidinemethanol was obtained from the pyridinemethanol hydrochloride by hydrogenation and had a melting point of 188–190° C.

Other piperidinemethanols which are useful in the preparation of the new compounds include:

α-Methyl-α-ethyl-2-piperidinemethanol
α,α-Diethyl-6-methyl-2-piperidinemethanol
α,α-Diphenyl-4,6-dimethyl-2-piperidinemethanol
α-Phenyl-α-(p-tolyl)-4-ethyl-2-piperidinemethanol
α - Phenyl - α - (p - methoxyphenyl) - 6 - methyl - 2 - piperidinemethanol
α,α-Di-(o-methoxyphenyl)-2-piperidinemethanol
α-(6-Tolyl)-α-(p-methoxyphenyl)-2-piperidinemethanol
α-Methyl-α-ethyl-3-piperidinemethanol
α,α-Di(m-methoxyphenyl)-3-piperidinemethanol
α,α-Di(p-tolyl)-4,6-dimethyl-3-piperidinemethanol
α(p-Tolyl)-α-(o-methoxyphenyl)-3-piperidinemethanol
α,α-Diphenyl-6-ethyl-3-piperidinemethanol
α,α-Diphenyl-2,6-dimethyl-4-piperidinemethanol
α,α-Di(o-methoxyphenyl)-6-ethyl-4-piperidinemethanol
α,α-Dimethyl-6-ethyl-4-piperidinemethanol
α,Methyl-α-ethyl-4-piperidinemethanol

EXAMPLE VI

N-diethylphosphoryl-α,α-diphenyl-2-piperidinemethanol

To 12.7 g. (0.047 mole) of α,α-diphenyl-2-piperidinemethanol in 100 ml. of benzene was added 4.6 ml. (0.025 mole) of diethylchlorophosphate. The mixture was refluxed six hours and allowed to stand for 48 hours at room temperature. The mixture was filtered and a precipitate of 6.7 g. was obtained as the HCl salt.

The filtrate, containing the crude N-diethylphosphoryl-α,α-diphenyl-2-piperidinemethanol, was evaporated on the steam bath and the residue extracted with 100 ml. of ether under reflux. The ether extract was diluted with an equal volume of petroleum ether, cooled and filtered. The precipitate of the crude N-diethylphosphoryl-α,α-diphenyl-2-piperidinemethanol was recrystallized from ether; M. P. 162–165° C.

*Analysis.*—Calcd. for $C_{22}H_{30}O_4NP$: N, 3.47; P, 7.68. Found: N, 3.61; P, 7.68.

This compound is useful as a depressant for the nervous system in the above-indicated dosages.

EXAMPLE VII

N-diethylphosphoryl-α,α-diphenyl-4-piperidinemethanol

Following the procedure of Example VI using α,α-diphenyl-4-piperidinemethanol (prepared from α,α-diphenyl-4-pyridinemethanol following the procedure of Example I), 60 percent of the desired product was obtained; M. P. 223–224° C.

*Analysis.*—Calcd. for $C_{22}H_{30}O_4NP$: N, 3.47; P, 7.68. Found: N, 3.68; P, 7.35.

This compound is useful as a depressant for the nervous system in the above-indicated dosages.

EXAMPLE VIII

N-diethylphosphoryl-α-cyclohexyl-α-phenyl-4-piperidinemethanol

α-Cyclohexyl-α-phenyl-4-pyridinemethanol was prepared as follows. A solution of 55 g. (0.3 mole) of 4-benzoylpyridine in 100 ml. of toluene was added at 20° to an ether solution of cyclohexylmagnesium chloride prepared from 60 g. (0.5 mole) of cyclohexyl chloride, 13 g. (0.54 mole) of magnesium turnings and 250 ml. of dry ether. The mixture was then refluxed an hour, decomposed with aqueous ammonium chloride and filtered; yield: 52 g. (65%) of crude base melting at 184–186°. An analytical sample melted at 193–194°.

*Analysis.*—Calcd. for $C_{18}H_{21}ON$: C, 80.83; H, 7.92. Found: C, 80.60; H, 7.80.

The hydrochloride salt melted at 205–207° dec.

*Analysis.*—Calcd. for $C_{18}H_{21}ON \cdot HCl$: C, 71.17; H, 7.30. Found: C, 70:97; H, 7.28.

α-Cyclohexyl-α-phenyl-4-piperidinemethanol was prepared by the hydrogenation of 16 g. (0.052 mole) of the above hydrochloride in 100 ml. of 90% ethanol with 0.8 g. of platinum oxide catalyst. The reaction mixture was filtered, the filtrate evaporated on the steam bath to a volume of 60 ml. and diluted with 4 volumes of dry ether. The solution was cooled and filtered; yield: 16 g. (98%) of desired hydrochloride melting at 279–280° dec. An analytical sample melted at 280–281° dec.

*Analysis.*—Calcd. for $C_{18}H_{27}ON \cdot HCl$: C, 69.75; H, 9.11. Found: C, 69.42; H, 9.10.

The desired N-diethylphosphoryl derivative was prepared as follows. A mixture of 23 g. (0.073 mole) of the above piperidine hydrochloride and 16.5 g. (0.163 mole) of triethylamine in 300 ml. of dry benzene was refluxed an hour with stirring. To this mixture was added 14.3 g. (0.084 mole) of diethyl chlorophosphate over a period of an hour at 40–50°. The reaction mixture was refluxed 16 hours, and then filtered from the solid triethylamine·HCl. The filtrate was washed with water and evaporated on the steam bath to a volume of about 100 ml. About 300 ml. of 40–60° petroleum ether was added, the mixture cooled and filtered; yield: 20 g. of crude product. A second crop obtained by evaporation and dilution with pet. ether amounted to 8.7 g. The two crops were recrystallized from 80% methanol to give 18.5 g. (62%) of desired N-diethylphosphoryl-α-cyclohexyl-α-phenyl-4-piperidinemethanol melting at 113–114°.

*Analysis.*—Calcd. for $C_{22}H_{36}O_4NP$: N, 3.42; P, 7.56. Found: N, 3.32; P, 7.60.

This compound is useful in the medical management of such psychotic and psychoneurotic conditions as hallucinations, delusions and psychotic and psychoneurotic over-activity, e. g., the improvement and suppression of symptoms of dementia praecox (schizophrenia), hallucinations of alcoholism, and the manic manifestations of manic depressive psychoses, in the above-indicated dosages. The compound is also useful as a depressant for the nervous system.

EXAMPLE IX

*N-diethylphosphoryl-α-(p-anisyl)-α-phenyl-4-piperidinemethanol*

From 4-benzoylpyridine and p-methoxyphenyl magnesium bromide the intermediate α-phenyl-α-(p-anisyl)-4-pyridinemethanol was prepared using the procedure of Example XIV below and obtained in 68% yield. The product melted at 200–204° C.

*Analysis.*—Calcd. for $C_{19}H_{17}O_2N$: C, 78.33; H, 5.89. Found: C, 78.48; H. 5.89.

Hydrogenation of 20 g. (0.07 mole) of the above base in 150 ml. of 80% acetic acid with 0.8 g. platinum oxide gave 14 g. (70%) of desired piperidinemethanol isolated as the hydrochloride melting at 226–227° C. (decomposition).

*Analysis.*—Calcd. for $C_{19}H_{23}O_2N \cdot HCl$: C, 68.35; H, 7.25. Found: C, 67.99; H, 7.39.

This piperidine hydrochloride was converted to the desired diethylphosphoryl derivative using 14 grams (0.042 mole) and following the procedure in Example VIII. The N-diethylphosphoryl-α-(p-anisyl)-α-phenyl-4-piperidinemethanol was obtained in 48% yield and had a melting point of 143–145° C.

*Analysis.*—Calcd. for $C_{23}H_{32}O_5NP$: N, 3.23; P, 7.15. Found: N, 3.24; P, 7.08.

This compound is useful as a depressant for the nervous system in the above-indicated dosages.

EXAMPLE X

*N-diethylphosphoryl-α-(o-tolyl)-α-phenyl-4-piperidinemethanol*

α-o-Tolyl-α-phenyl-4-pyridinemethanol was prepared from 90 g. (0.49 mole) of 4-benzoylpyridine in 200 ml. of toluene and o-tolyllithium obtained from 7 g. (1 gram atom) of lithium, 86 g. (0.5 mole) of o-bromotoluene, and 380 ml. of dry ether (following directions in Example VIII for α-cyclohexyl-α-phenyl-4-pyridinemethanol); yield: 102 g. (75%); M. P. 229–231° fusing.

*Analysis.*—Calcd. for $C_{19}H_{17}ON$: C, 82.89; H, 6.23. Found: C, 82.02; H, 6.36.

The hydrochloride melted at 214–215° dec.

*Analysis.*—Calcd. for $C_{19}H_{17}ON \cdot HCl$: C, 73.19; H, 5.82. Found: C, 72.96; H, 5.86.

The hydrochloride (36 g.; 0.115 mole) was hydrogenated in 230 ml. of ethanol containing 1 g. of platinum catalyst. The desired α-(o-tolyl)-α-phenyl-4-piperidinemethanol·HCl obtained amounted to 22 g. (61%) M. P. 256–257° dec.

*Analysis.*—Calcd. for $C_{19}H_{23}ON \cdot HCl$: C, 71.79; H, 7.61. Found: C, 71.43; H, 7.47.

This piperidine hydrochloride was converted to the desired diethylphosphoryl derivative following the procedure in Example VIII. The N-diethylphosphoryl-α-o-tolyl-α-phenyl-4-piperidinemethanol melted at 179–181°.

*Analysis.*—Calcd. for $C_{23}H_{32}O_4NP$: N, 3.36; P, 7.42. Found: N, 3.38; P, 7.58.

This compound is useful as a depressant for the nervous system in the above-indicated dosages.

EXAMPLE XI

*N-diethylphosphoryl-α,α-di-(o-tolyl)-4-piperidinemethanol*

The intermediate α,α-di-(o-tolyl)-4-pyridinemethanol was obtained as follows. To o-tolyllithium prepared from 148 g. (0.86 mole) of o-bromotoluene, 12 g. (1.7 mole) of lithium and 600 ml. of dry ether was added 50 g. (0.33 mole) of ethyl isonicotinate at −20° over a period of 30 minutes. The mixture was then refluxed an hour, decomposed with aqueous ammonium chloride, and filtered. The white precipitate was recrystallized from 1.8 liters of 75% ethanol; yield: 78 g. (82%); M. P. 178–182°. An analytical sample obtained by recrystallization from 80–90° pet. ether melted at 185–186°.

*Analysis.*—Calcd. for $C_{20}H_{19}ON$: C, 83.00; H, 6.62. Found: C, 82.72; H, 6.46.

The hydrochloride salt melted at 208–210° dec.

*Analysis.*—Calcd. for $C_{20}H_{19}ON \cdot HCl$: C, 73.72; H, 6.19. Found: C, 73.72; H, 6.26.

Hydrogenation of 40 g. (0.12 mole) of the above hydrochloride gave 18 g. (45%) of desired α,α-di-(o-tolyl)-4-piperidinemethanol·HCl melting at 305–306° dec.

*Analysis.*—Calcd. for $C_{20}H_{25}ON \cdot HCl$: C, 72.40; H, 7.90. Found: C, 72.27; H, 8.02.

This hydrochloride was converted to the desired N-diethylphosphoryl-α,α-di-(o-tolyl)-4-piperidinemethanol, which melted at 128–130° using the procedure of Example VIII.

*Analysis.*—Calcd. for $C_{24}H_{34}O_4NP$: N, 3.25; P, 7.18. Found: N, 3.30; P, 7.09.

This compound is useful as a depressant for the nervous system in the above-indicated dosages.

EXAMPLE XII

*N-dibutylphosphoryl-α,α-diphenyl-4-piperidinemethanol*

The procedure in Example VIII was carried out using 14 g. (0.046 mole) of α,α-diphenyl-4-piperidinemethanol·HCl, 11.4 g. (0.05 mole) of dibutyl chlorophosphate and 210 ml. of dry benzene, and 15 g. of crude product melting at about 159–163° was obtained. Recrystallization from methanol gave 12 g. (58%) of desired N-dibutylphosphoryl compound melting at 162–163°.

*Analysis.*—Calcd. for $C_{26}H_{38}O_4NP$: N, 3.05; P, 6.74. Found: N, 3.23; P, 6.61.

This compound is useful as a depressant for the nervous system in the above-indicated dosages.

EXAMPLE XIII

*N-dioctylphosphoryl-α,α-diphenyl-4-piperidinemethanol*

The procedure of Example VIII using 14 g. (0.046 mole) of α,α-diphenyl-4-piperidinemethanol·HCl, 18.4 g. (0.05 mole) of dioctyl chlorophosphate and 250 ml. of dry benzene was carried out. The desired product was crystallized from ethyl acetate; yield 4.6 gm. (17.5%), M. P. 65–80° C.; M. P. 89–91° C. when pure.

This compound is useful as a depressant for the nervous system in the above-indicated dosages.

EXAMPLE XIV

*N-diethylphosphoryl-α-(p-chlorophenyl)-α-phenyl-4-piperidinemethanol*

The intermediate α-(p-chlorophenyl)-α-phenyl-4-pyridinemethanol was prepared as follows:

To the Grignard reagent prepared from 21 g. (0.86 g. atom) of magnesium turnings, 172 g. (0.90 mole) of p-chlorobromobenzene and 500 ml. of dry ether was added 110 g. (0.60 mole) of 4-benzoyl pyridine in 150 ml. of dry ether at −20° C. over a one hour period with stirring. The mixture was allowed to warm up to 25° C. and refluxed on a steam bath for a 1 to 2 hour period. It was then decomposed with 90 g. (1.5 moles) of acetic acid in 100 ml. of water and filtered to give 195 g. of crude material. A 30 g. sample of the crude material was recrystallized from ethanol to give 16 g. (54%) of product melting at 202–204° C.

*Analysis.*—Calcd. for $C_{18}H_{14}ONCl$: C, 73.09; H. 4.77. Found: C, 73.10; H, 4.83.

α-(p-Chlorophenyl)-α-phenyl-4-piperidinemethanol was prepared by treating a mixture of 16 g. (0.054 mole) of the above free base in 250 ml. of absolute ethanol with 4.5 ml. (0.054 mole) of alcoholic hydrogen chloride; 0.5 g. of platinum oxide was added and the mixture was shaken in the presence of hydrogen (initial pressure of 60 lbs.) until the theoretical amount of hydrogen was absorbed. The product crystallized during the hydrogenation and was dissolved by adding a large quantity of absolute ethanol and heating. The catalyst was removed by filtration and the filtrate was cooled and filtered; yield 9 g. (50%); M. P. 256–259° C. An analytical sample melted at 263–264° C.

*Analysis.*—Calcd. for $C_{18}H_{20}ONCl \cdot HCl$: C. 63.90; H, 6.26. Found: C, 63.80; H, 6.36.

This piperidine hydrochloride was converted to the desired diethylphosphoryl derivative following the procedure of Example VIII. The N-diethylphosphoryl-α-(p-chlorophenyl)-α-phenyl-4-piperidinemethanol melted at 150–151° C.

*Analysis.*—Calcd. for $C_{22}H_{29}O_4NPCl$: N, 3.20; P, 7.08. Found: N, 3.28; P, 6.95.

This compound is useful as a depressant for the nervous system in the above-indicated dosages.

EXAMPLE XV

*N-diethylphosphoryl-α-(p-phenetyl)-α-phenyl-4-piperidinemethanol*

The intermediate α-(p-phenetyl)-α-phenyl-4-pyridinemethanol was prepared as follows:

To 6.94 g. (1.00 g. atom) of lithium in 750 ml. of dry ether was added 100.5 g. (0.50 mole) of p-bromophenetole in 100 ml. of dry ether over a ½-hour period with refluxing. The solution was cooled to −60° C. and an ether solution of 86 g. (0.47 mole) of 4-benzoylpyridine was added over a fifteen minute period. The reaction mixture was stirred for 3 hours and allowed to rise to 25° C. and then decomposed with ammonium chloride solution. The crude product was removed by filtration and washed with water to give 100 g. (70% yield) of free base, M. P. 177–184° C. An analytical sample melted at 187–189° C. A crystalline hydrochloride was not obtained.

*Analysis.*—Calcd. for $C_{20}H_{19}O_2N$: C, 78.65; H. 6.27. Found: C. 78.71; H, 6.38.

α-(p-Phenetyl)-α-phenyl-4-piperidinemethanol was prepared by adding a solution of 50 g. (0.146 mole) of oily hydrochloride from above in 250 ml. of methanol to 0.8 g. of platinum oxide. The mixture was shaken in the presence of hydrogen (initial pressure of 60 lbs.) until the theoretical amount of hydrogen was absorbed. The mixture was filtered and the filtrate cooled and crystallized to give 17 g. (34%) melting at 179–181° C. An analytical sample melted at 198–199° C.

*Analysis.*—Calcd. for $C_{20}H_{25}O_2N \cdot HCl$: C, 69.06; H, 7.54. Found: C, 69.17; H, 7.67.

This piperidine hydrochloride was converted to the desired diethylphosphoryl derivative following the procedure of Example VIII. The N-diethylphosphoryl-α-(p-phenetyl)-α-phenyl-4-piperidinemethanol melted at 149–151° C.

*Analysis.*—Calcd. for $C_{24}H_{34}O_5NP$: N, 3.13; P, 6.92. Found: N, 3.12; P, 6.90.

EXAMPLE XVI

*N-diethylphosphoryl-α-benzyl-α-phenyl-4-piperidinemethanol*

From 4-benzoylpyridine and benzylmagnesium chloride, the intermediate α-benzyl-α-phenyl-4-pyridinemethanol was prepared using the procedure of Example XIV and was obtained in 47% yield. The product melted at 188–189° C.

*Analysis.*—Calcd. for $C_{19}H_{17}ON$: C, 82.92; H, 6.23. Found: C, 82.86; H, 6.29.

The hydrochloride salt melted at 267–269° C.

*Analysis.*—Calcd. for $C_{19}H_{17}ON \cdot HCl$: C, 73.21; H, 5.82. Found: C, 73.40; H, 5.82.

Hydrogenation of 46 g. (0.167 mole) of the above hydrochloride gave 39 g. (75%) of desired piperidinemethanol. HCl melting at 250–252° C. (decomposition).

*Analysis.*—Calcd. for $C_{19}H_{23}ON \cdot HCl$: C, 71.81; H, 7.61. Found: C, 72.02; H, 7.66.

This piperidine hydrochloride was converted to the desired diethylphosphoryl derivative following the procedure of Example VIII. The N-diethylphosphoryl-α-benzyl-α-phenyl-4-piperidinemethanol melted at 109–112° C.

*Analysis.*—Calcd. for $C_{23}H_{32}O_4NP$: N, 3.36; P, 7.42. Found: N, 3.29; P, 7.21.

This compound is useful as a depressant for the nervous system in the above-indicated dosages.

Other N-dialkyl phosphoryl-piperidinemethanols of this invention which are prepared by the above procedures include:

N - dimethylphosphoryl - α - phenyl - α - methyl - 2-piperidinemethanol.

N - di - n - propylphosphoryl - α - phenyl - α - ethyl-2-piperidinemethanol.

N - di - n - butylphosphoryl - α,α - diphenyl - 6 - methyl-2-piperidinemethanol.

N - di - n - hexylphosphoryl - α,α - di(p-tolyl) - 6-ethyl-2-piperidinemethanol.

N - di - n - octylphosphoryl - α,α - di(o - methoxyphenyl)-2-piperidinemethanol.

N - di - i - propylphosphoryl - α,α - dimethyl - 2-piperidinemethanol.

N - ethyl - t - butylphosphoryl - α,α - diethyl - 2-piperidinemethanol.

N - methyl - i - amylphosphoryl - α,α - diphenyl - 2-piperidinemethanol.

N - ethyl - sec - butylphosphoryl - α,α - diphenyl - 2-piperidinemethanol.

N - dimethylphosphoryl - α - phenyl - α - methyl - 3-piperidinemethanol.

N - diethylphosphoryl - α - phenyl - α - ethyl - 3-piperidinemethanol.

N - di - i - propylphosphoryl - α,α - diphenyl - 6 - methyl-3-piperidinemethanol.

N - di - n - hexylphosphoryl - α,α - di(p-tolyl) - 3-piperidinemethanol.

N - di - n - octylphosphoryl - α,α - di(o - methoxyphenyl)-3-piperidinemethanol.

N - dimethylphosphoryl - α,α - diphenyl - 4 - piperidinemethanol.

N - diethylphosphoryl - α,α - diphenyl - 4 - piperidinemethanol.

N - di - n - butylphosphoryl - α,α - di(o - tolyl) - 4-piperidinemethanol.

N - di - n - hexylphosphoryl - α,α - diethyl - 4 - piperidinemethanol.

N - di - n - octylphosphoryl - α - phenyl - α - ethyl - 4-piperidinemethanol.

N - di - n - butylphosphoryl - α,α - diphenyl - 2,6 - dimethyl - 4 - piperidinemethanol.

We claim:

1. The compounds of the formula

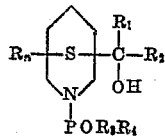

in which S signifies that the ring is saturated; $n$ is an integer from 1 to 4 inclusive; R is selected from the group consisting of the hydrogen atom and the methyl and ethyl radicals; $R_1$ and $R_2$ are selected from the group consisting of the methyl, ethyl, phenyl, chlorophenyl, tolyl, methoxy phenyl, benzyl, phenetyl, and cyclohexyl radicals; and $R_3$ and $R_4$ are lower alkoxy radicals having from 1 to 8 carbon atoms.

2. N - diethylphosphoryl - α - cyclohexyl - α - phenyl-4-piperidinemethanol.

No references cited.

UNITED STATES PATENT OFFICE
Certificate of Correction

Patent No. 2,832,786                                      April 29, 1958

Charles H. Tilford et al.

It is hereby certified that error appears in the above numbered patent requiring correction and that the said Letters Patent should read as corrected below.

Column 3, line 58, for "α-(6-Tolyl)-α-(p-methoxyphenyl)-2-piperidinemethanol" read —α-(p-Tolyl)-α-(p-methoxyphenyl)-2-piperidinemethanol—; column 4, line 2, after "6.7 g." insert the following —of α,α-diphenyl-2-piperidinemethanol—; line 47, for "C, 70:97" read —C, 70.97—; column 7, line 19, for "C, 63.80" read —C, 63.82—.

Signed and sealed this 19th day of August 1958.

[SEAL]

Attest:
KARL H. AXLINE,
Attesting Officer.

ROBERT C. WATSON,
Commissioner of Patents.